C. F. BRADBURN.
ELECTRIC HEATER.
APPLICATION FILED JULY 7, 1916.
1,233,968.
Patented July 17, 1917.
3 SHEETS—SHEET 1.
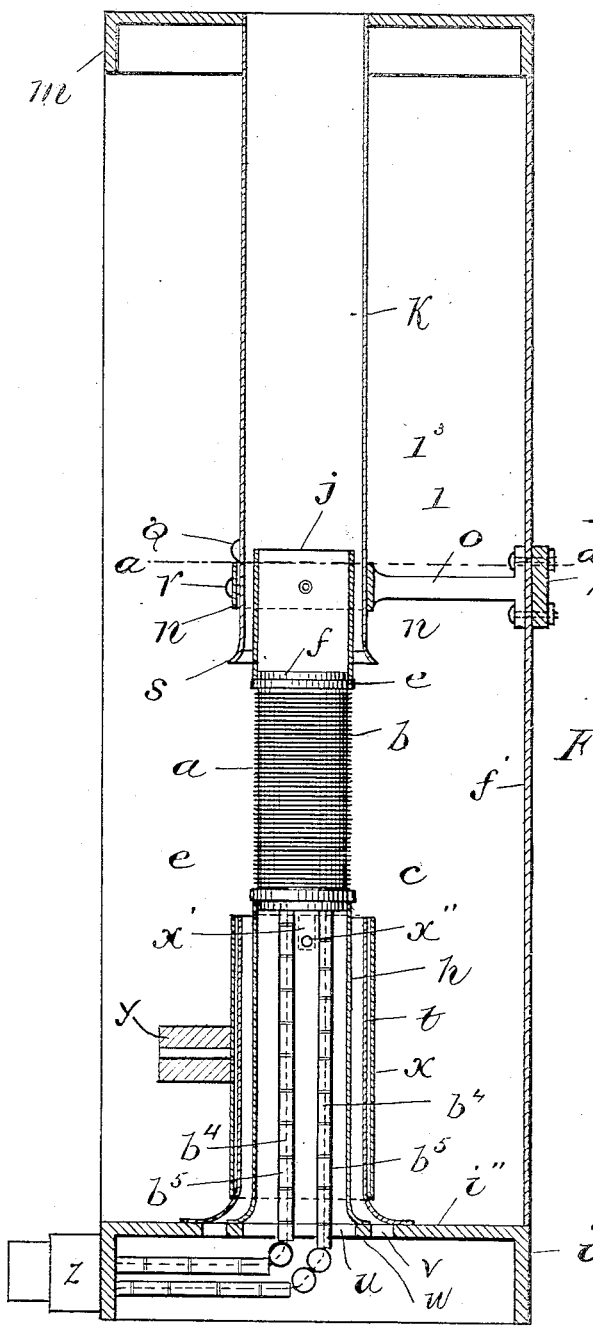
Fig. 1.
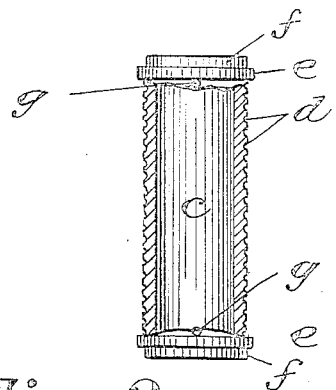
Fig. 2.
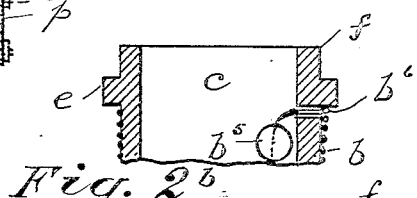
Fig. 2$^b$.
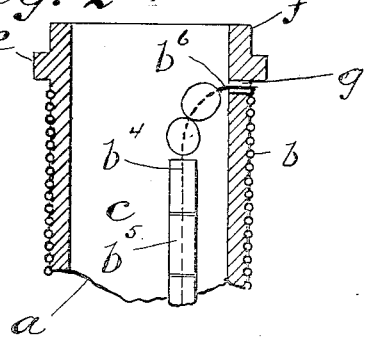
Fig. 2$^a$.
Inventor
Chas. F. Bradburn
per Chas W Riches
Attorney

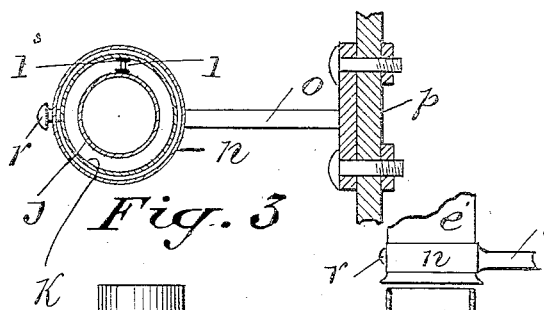
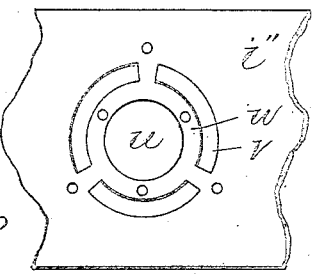
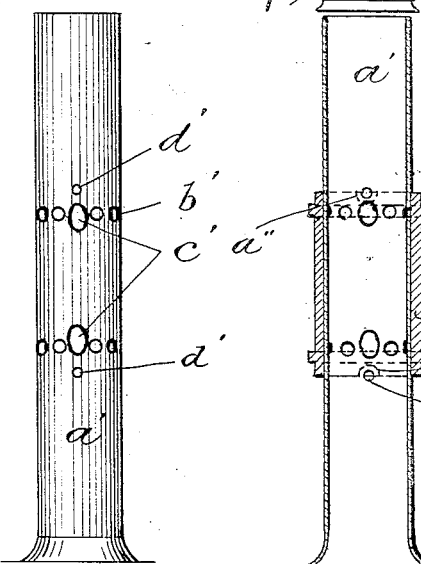
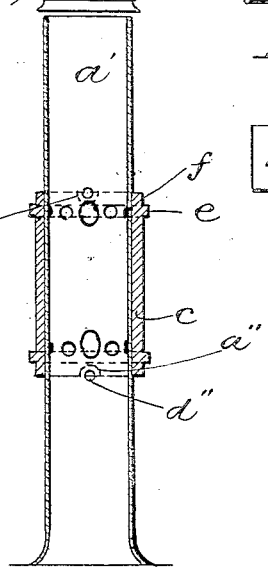
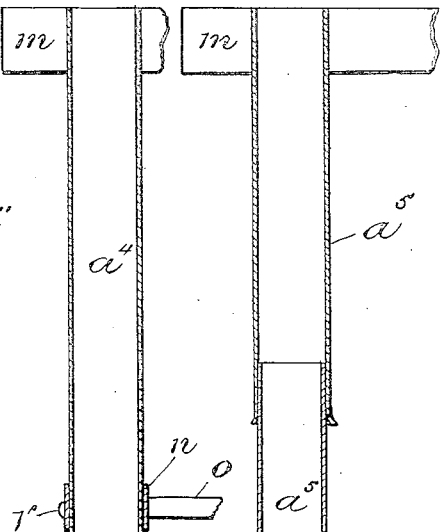
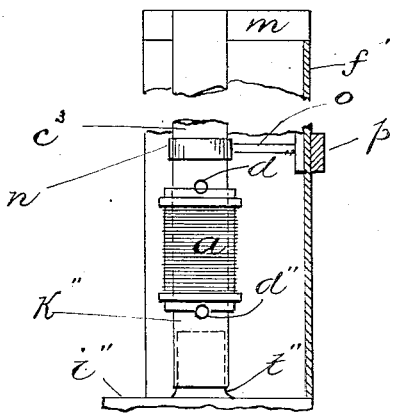
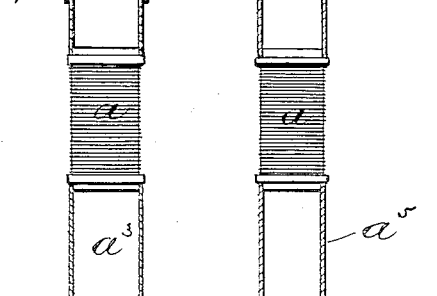

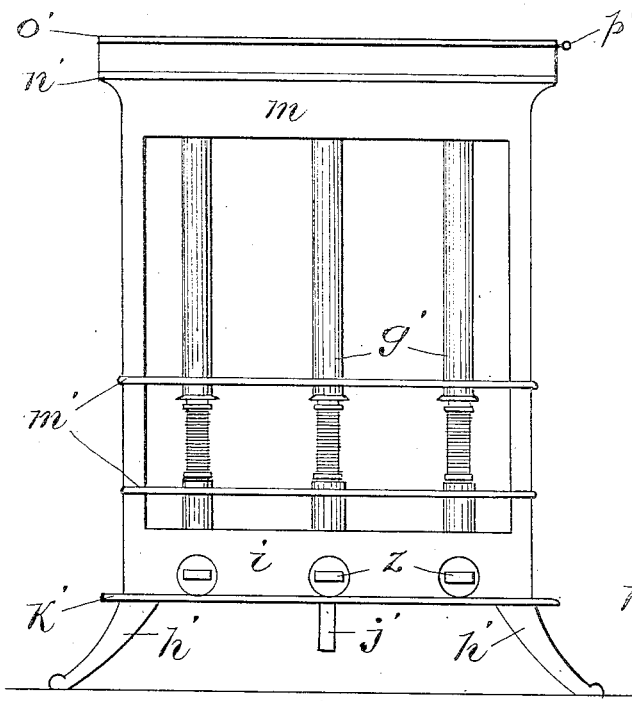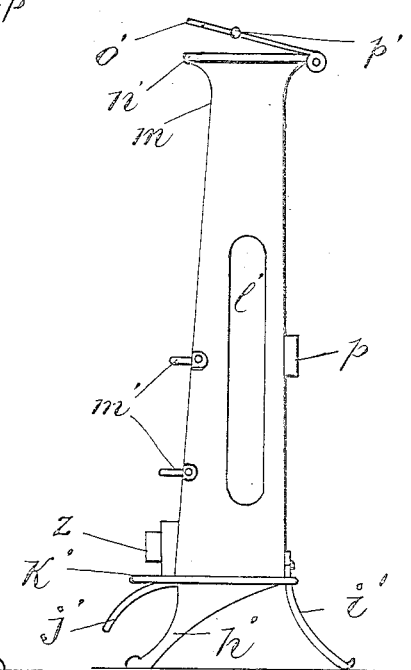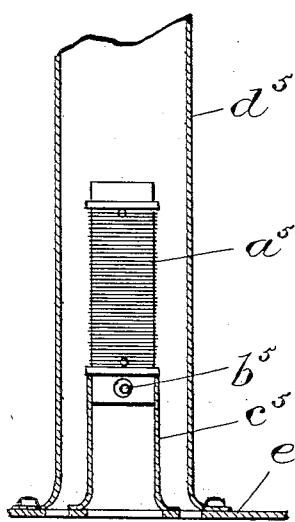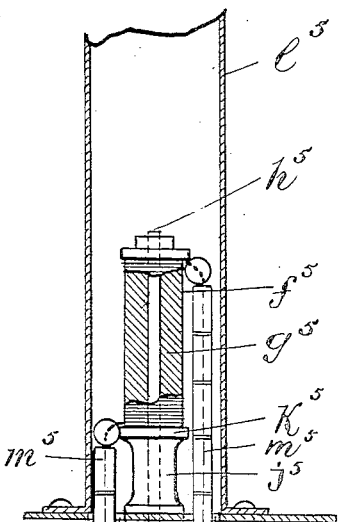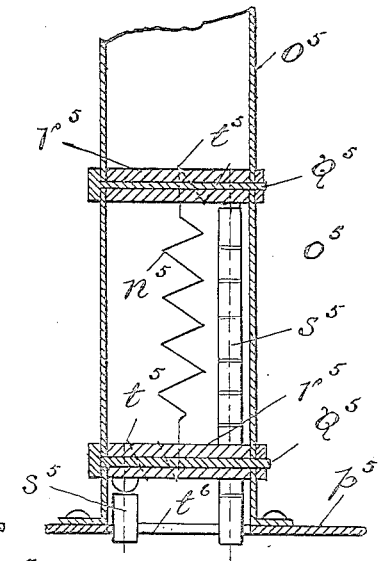

UNITED STATES PATENT OFFICE.

CHARLES FRANKLIN BRADBURN, OF DELMER, ONTARIO, CANADA.

ELECTRIC HEATER.

1,233,968.   Specification of Letters Patent.   Patented July 17, 1917.

Application filed July 7, 1916. Serial No. 108,012.

*To all whom it may concern:*

Be it known that I, CHARLES FRANKLIN BRADBURN, of the village of Delmer, in the county of Oxford and Province of Ontario, Dominion of Canada, have invented certain new and useful Improvements in Electric Heaters; and I hereby declare that the following is a full, clear, and exact description of the same.

In electric heaters, the distribution of the heat generated is due, almost wholly, to two principles, that of convection and that of radiation, the principle of conduction applying only in an indirect way, and of the two principles, convection and radiation, the former is by far the more important.

Electric heaters, as commonly constructed, however, are without any special means of establishing and directing convection currents.

A principal object of the present invention is to facilitate the distribution of heat by means of convection or draft tubes, forming channels, these tubes or channels establishing convection currents and directing the same to such places as may be desired.

The particular form the invention may take will depend upon the particular form of the heat element it is desired to use.

If the heat element be a high-resistance coreless winding, that is, one devoid of a solid core, or if it be a high-resistance winding upon a solid core, the heat element will be placed either within or slightly beneath the convection tube, and preferably upon a vertical axis, the convection tube itself being necessarily vertical, or if not vertical throughout its length, must at least embrace a vertical section, the particular shape or cross section of the tubing surrounding or adjacent the heat element, being determined by the form or cross section of the heat element. In this way, several heat elements may be served by a common convection tube.

The particular kind of heat element that best serves the general purpose of the invention, and the one first described herein, comprises a high-resistance winding upon a hollow refractory core, preferably cylindrical.

In the case of such a heat element, the heater or heat unit is formed by inserting a metallic convection tube within the annular refractory core and of greater length, or by placing two sections of tubing collinear with and abutting this core, one above and the other beneath the refractory core, and by this means extending such core beyond the limits of the high-resistance winding, the axis of the core being, of course, vertical.

This extended core furnishes a convection channel for the heat dissipated by the interior of the refractory core, and the core thus extended constitutes a convection tube. The refractory core itself might be extended beyond the limits of the winding, but this would be undesirable.

In either case, whether the core be extended by the use of a single tube passing through it, or by the use of collinear tubes to form a convection channel, the high-resistance winding, with its extended core, is surrounded or placed within a second convection tube, which extends much higher that the upper extremity of the contained extended core, and is co-axial therewith, there being an annular space between this tube and the extended core within it, which space constitutes a convection channel for the heat dissipated by the exterior of the core.

Interior and exterior convection currents meet in a common current above the extremity of the central tube or extended core. The above parts comprise the basic elements of a heat unit, and are mounted with their connections in a suitable frame or the like.

The general action of a heat unit may be described as follows:—On switching on the current, the high-resistance winding and refractory core are slowly heated, preferably to a light red; the air in contact with the same is heated through conduction, expands, and because of its buoyancy or lessened specific gravity, is displaced by cooler air and rises, thus establishing convection currents or drafts through the convection tubes, the current rising through the interior of the core meeting with that which rises about the exterior of the core, and the united currents passing upwardly.

The detail description of several forms of the invention, which are deemed to give high efficiency and be of great utility, are hereinafter described and shown in the drawings, in which:—

Figure 1, is a longitudinal sectional elevation of a heat unit and the mounting or frame containing the unit;

Fig. 2, is a sectional elevation of the core of the heat unit;

Fig. 2ª, is a fragmentary detail view showing the leads for the high-resistance winding passing into the core;

Fig. 2ᵇ, is a fragmentary detail view showing the leads;

Fig. 3, is a cross section of the convection tubing shown in Fig. 1, taken in a horizontal plane on the line a—a, Fig. 1;

Fig. 4, is a fragmentary plan view of that portion of the lower limb of the frame where the lower components of the convection tubing are joined to the upper web of that limb;

Fig. 5, is an elevation of an interior convection tube that may be used instead of the extension shown in Fig. 1;

Fig. 6, is a longitudinal section of the tube shown in Fig. 5, with the refractory core on it;

Fig. 6ª, is a modification of the tube shown in Fig. 5, showing the central convection channel formed of two tubes;

Fig. 6ᵇ, shows a further modification of the tube shown in Fig. 5;

Fig. 7, is a front elevation of a heater or frame in which one or a number of heat units may be used;

Fig. 8, is a side elevation of the heater shown in Fig. 7;

Fig. 9, is a modification of the construction shown in the preceding figures;

Fig. 10, is a fragmentary detail view in which the hollow refractory core is mounted on a convection tube within a second tube;

Fig. 11, is a fragmentary detail view showing the use of a solid refractory core; and, Fig. 12, is a fragmentary detail view showing the use of a coreless high-resistance winding.

Like characters of reference refer to like parts throughout the specification and drawings.

In Figs. 1 and 2, a is the heat element, comprising a high-resistance winding b wound preferably in a spiral groove d, upon the exterior of the hollow refractory core c, provided with collars e, molded or formed thereon. Beyond the collars e are ungrooved extensions f, and in the core c, between and adjacent to the collars, are holes g, through which the leads of the high-resistance winding pass to the interior of the core.

The lower extension of the core of the heat element a fits loosely within the lower tube h, the upper edge of which engages or contacts with the lower collar e of the core. This tube h is mounted upon the lower limb or base i of the frame containing the heat unit or units, and serves to carry the heat element a.

The upper extension of the core of the heat element a fits similarly within the upper tube j, the lower edge of which contacts with the upper collar e of the core.

The heat element a and connected tubing are set vertically within the frame containing them, for reasons previously stated.

Almost the whole of the tube j is contained within the lower part of a larger tube k, and is supported in its fixed relation to the larger tube, by a pin l passing diametrically through the two tubes, beads $l^2$ being placed upon the pin to prevent its deflection under heat, and to prevent transverse displacement of the tube j. Instead of the pin, other mechanical means, such as a perforated collar, may be used for this purpose, but a collar would interfere to a greater or less extent with the convection currents in the tubes.

The tube k passes, at its upper end, through the upper limb m of the frame, and at its lower end passes through a band or collar n, held by an arm o, attached by bolts or screws to a transverse bar p crossing the frame horizontally at the rear.

The tube k is made slidable within the band n, and carries with it, the tube j. The tube k is provided with a limiting stop screw q which engages the band n, while a screw r on the band n serves as a lock. The tube k is also provided with a curving flange s which serves several purposes, viz: to act as a limit or stop for the upward movement of the tube k, to gather and direct air currents inwardly within the tube, and to provide an easy entrance for a telescopic tube x, hereinafter to be described.

External to the lower tube h, concentric therewith, and of greater diameter, but of slightly less length, is a tube t attached to the upper web i'' of the base or lower limb of the frame. These lower tubes h and t have flaring basal extremities, to permit of attachment by means of screws to the upper web i'' of the base or lower limb of the frame, this web having air passages through it to correspond to the air passages or channels formed by the tubes h and t. For instance, in Fig. 4, the central opening u is for the inner tube h, and the broken annular passages v are for the outer tube t, while the intervening annular web w serves for the attachment and support of the inner tube, the exterior tube being attached to that portion of the main web i'' of the base or lower limb outside of the passages v.

Telescoping upon the tube t, is a tube x carrying a heat-insulating knob y. This tube x is co-equal in length with the straight portion of the tube t, and when in its lowest position, uncovers the heat element $a$, leaving an unobstructed view of the same from the front of the heater, but when raised to its upper limit, it being of greater length than the heat element, covers the same and slides or telescopes within the upper tube $k$, causing, when closed, a stronger convection current than when open, to rise across the exterior of the heat element and pass up the tube $k$, if so desired, thus shutting off the direct radiation and lessening the effect of the heat to the front of the apparatus, but increasing it above. This slidable tube $x$ carries at its upper end a strip spring or tongue $x'$, and upon the telescoping of this tube within the tube $k$, the tongue engages the inner wall of the latter and prevents the tube $x'$ from falling, while the attachment or rivet $x''$ of the tongue acts as a limit or stop upon engaging the flange of the tube $k$, this rivet $x''$ being located at the lower end of the tongue. When the tube $x$ is raised, and covers the heat element, there are thus formed two closed convection channels, that is to say, a cylindrical channel passing through the refractory core and its extensions, and an annular channel outside of the same, these channels uniting in a common channel through the tube $k$ above the upper extremity of the extended core.

The leads $b^4$ of the high-resistance winding, pass through the holes $g$ to the interior of the core $c$, and thence pass downwardly through the tube $h$ to a switch $z$ in the base $i$, these leads carrying insulating beads $b^5$ to prevent short-circuiting with each other or making contact with the inner tube they pass through, or with the base.

In order to prevent the end turns of the high-resistance coil from becoming loose on the core $a$, a separate length $b^6$ of high-resistance wire is used in connection with each lead. This is looped around the core and wedged between the collar and the adjacent turn of the regular winding, and the ends of this length of wire $b^6$ are then brought through the hole $g$, along with the lead wire, which is continuous with the coil, and the wires are twisted tightly together within the inner wall of the core, and thence carried downwardly to the switch, this method insuring the coil or winding against any looseness due to slackening in the leads, and forming, if desired, a comparatively low-resistance lead to the switch.

By extending the upper section of the central convection tube, the exterior convection tube may be dispensed with, and still much of the benefit of the system retained, or conversely, the central tube may be removed, the exterior tube remaining and much of the benefit retained. The use, however, of convection tubes or channels, both interior and exterior to the refractory core, is greatly to be preferred.

In the case of the use of a single central convection tube instead of the separate tubes $h$ and $j$, the same system of outer tubes and of telescopic tubes may be used.

Figs. 5 and 6 show the construction of such alternative single central convection tube, in which the tube $a'$ carries two rings of circular holes $b'$ positioned so as to be just within the extremities of the surrounding refractory core. The purpose of these holes is to prevent too great a conduction of heat from the refractory core and a corresponding reduction of the pleasing incandescent appearance of the same when used openly.

The two enlarged holes $c'$ are for the reception of the leads that pass through them. The two smaller holes $d'$ are for the reception of small bolts $d''$, see Fig. 6, by which the heat element or refractory core is attached to the tube $a'$. The heads of these bolts fit into recesses $a''$ formed in the edges of the refractory core, and serve to prevent either longitudinal or rotational displacement of the core.

In Fig. 6, the heat element is shown in assembly with the above tube, and in the same figure, it is clearly indicated how this tube $a'$ may be provided with an upper tube $e'$ corresponding with the tube $k$, but of a smaller diameter, and in this construction, the tube $t$ and the sliding tube $x$ may be dispensed with, thus providing but one convection channel, and that a central one through the inner tube $a'$.

While, of course, in this use of a single and central convection channel, the tubing may either be as above, viz: a tube interior to the core, or the interior tube may be formed of two tubes $a^3$, $a^4$, as shown in Fig. 6$^a$, the latter being more convenient in the matter of assembly, repair or replacement, while on the other hand, the modification shown by the tube $a'$ in Fig. 5, admits of extension to the upper rim of the frame itself without requiring any telescopic arrangement or any supporting standard if the distance be not too great.

Furthermore, the inner tube, as shown in Fig. 6$^b$, may be made of a plurality of sections $a^5$, which may be telescoped upon themselves without the use of an arm and band, and the telescoping may occur either above or beneath the heat element, or both.

Other modifications might be made, as for example, an upper abutting tube $c^3$ may be carried by the heat element itself, as shown in Fig. 9, and the lower part of the outer tube $k''$ may telescope upon the lower tube $t''$, but it is believed that the use of abutting tubes or core extensions, the upper passing through a supporting band similar to the collar or band $n$ and arm $o$ shown in Fig. 1, and continued to the upper limb $m$ of the framing shown in the same figure, possesses advantages if only a single central convection channel be desired, but the complete system illustrated in Fig. 1, and utilizing both inner and outer channels of convection, is to be preferred over all others.

The use of a reflector, as shown at $f'$ in Fig. 1, placed in rear of the heat element and attached to the back of the frame or mounting, is intended, and protecting bars $m'$ may be placed in front of the heat element or elements and tubing.

Tubing of considerable length in proportion to its cross sectional area, is requisite, if the highest results are to be attained. The system furnishes the means of obtaining and directing very strong convection currents without, if desired, impairing the amount or intensity of direct radiation set up in the heat element.

The best type of core, however, is that shown in the drawings—a hollow cylindrical core with wire of circular cross section winding within a spiral groove upon the core—as this arrangement reduces oxidation of the wire, quickly absorbs heat from the same, and presents a large dissipating surface to the air currents.

A metal strip or ribbon may be employed instead of wire, but is less suitable for ordinary use.

It may here be noted that among the simpler modifications of the system, the several constructions shown diagrammatically in Figs. 10, 11 and 12, admit of easy assembly.

In Fig. 10, a heat element $a^5$, similar to that shown in Fig. 1, is connected by means of a bolt or pin $b^5$, to an inner tube $c^5$, the lower extension of the refractory core of the heat element fitting within said tube. A tube $d^5$, of larger diameter than the tube $c^5$ and heat element, surrounds the same. The above tubes are connected to the base $e^5$, after the manner shown in Figs. 1 and 4, and the wiring also is similar.

Fig. 11 shows a heat element $f^5$ having a solid core $g^5$, connected by an axial bolt $h^5$ to the base $i^5$, the core $g^5$ having an extension $j^5$ beneath its lower collar $k^5$. This heat element is positioned within a tube $l^5$ carried by the base $i^5$, and broken annular passages $x^5$ extend through the base. Insulated leads $m^5$ extend down the annular space surrounding the heat element and pass to the switch.

In Fig. 12 is shown a coreless heat element $n^5$, being the core or winding carried in a tube $o^5$, mounted on the base $p^5$. Two diametral bolts or pins $q^5$ pass through the tube, and these carry insulating sleeves $r^5$. Around the sleeves are wound the leads $s^5$, which pass to the switch, the sleeves carrying grooves at the places $t^5$ of the latter windings, and the leads $s^5$ being bare upon the windings but insulated elsewhere.

There is, of course, a circular opening $t^6$ in the base to provide an air passage and to accommodate the leads.

The form of frame or mounting for the heat unit is not important, but in Figs. 7 and 8, is shown a form of heater adapted for convenient use. In these figures, $g'$ are the heat elements and connecting tubing, shown within a frame to resemble a fire place provided with three legs, one $h'$ at either side, and one $i'$ at the rear.

The projection $j'$ is an emergency attachment at the front which tends to prevent the tipping over of the heater forwardly.

A ledge $k'$ is formed upon the base of the mounting at the front of the heater. The sides of the mounting are cut out at $l'$ to give visibility of the contained heat elements, and protection bars $m'$ are placed upon the face of the heater.

The convection tubes are brought flush with the upper surface of the upper limb $m$. Above the upper limb is placed a perforated or open shelf $n'$, and pivoted to the rear edge of this shelf is a baffle plate $o'$ controlled by a lever $p'$ to deflect the heat forward, if desired, or to turn back out of the way when the shelf $o'$ is to be used.

Having thus fully described the nature of my invention, what I claim as new and desire to secure by Letters Patent, is:—

1. An electric heater comprising a high resistance winding, a refractory core therefor, a convection tube combined with the core to extend the same beyond the limits of the winding, and a convection tube surrounding the winding and extended core to create convection currents exteriorly thereof.

2. An electric heater comprising a high resistance winding, a refractory core therefor, and a removable convection tube combined with the core to extend the same beyond the limits of the winding, and create convection currents interiorly thereof, and a tube surrounding the convection tube and creating a circulation of air currents to combine with the convection currents above the top of said convection tube.

3. An electric heater comprising a high resistance winding, a refractory core therefor, and a removable convection tube loosely mounted upon the core to extend the same beyond the limits of the winding, and create convection currents interiorly thereof.

4. An electric heater comprising a high resistance winding, a refractory core therefor, a convection tube combined with the core to extend the same beyond the limits of the winding, and create convection currents interiorly thereof, and a convection tube surrounding the winding and extended core, creating convection currents exteriorly thereof, the latter tube having a movable section surrounding the winding.

5. An electric heater comprising a hollow refractory core, a high resistance winding thereon, with suitable connections, a wire loop encircling each end of the core, and passing through a corresponding opening to the interior thereof, and means for securing either end of the winding by drawing its lead through the said corresponding opening and twisting it with the wire of the loop within the interior of the core.

6. An electric heater comprising a high-resistance winding, a refractory core therefor, and telescopic convection tubes exterior of the winding and core.

7. An electric heater comprising a high-resistance winding having appropriate connections, a hollow refractory core therefor, a convection tube extending the core beyond the winding, and a convection tube exterior of the core and winding.

8. An electric heater comprising a high-resistance winding having appropriate connections, a hollow refractory core therefor, a convection tube extending the core beyond the winding, and a telescopic tube surrounding the winding and core.

9. An electric heater comprising a high-resistance winding having appropriate connections, a hollow refractory core therefor, a convection tube extending the core beyond the winding, a convection tube exterior of the core and winding, and a convection tube above the core in which the convection currents from the interior and exterior of the core unite.

10. An electric heater comprising a high-resistance winding having appropriate connections, a hollow refractory core therefor, a convection tube extending the core beyond the winding, a telescopic tube surrounding the winding and core, and a convection tube above the core in which the convection currents from the interior and exterior of the core unite.

Toronto, June 24th, 1916.

CHARLES FRANKLIN BRADBURN.

Signed in the presence of—
EDWARD S. BERNSTEIN,
C. H. RICHES.